United States Patent
Matsuda et al.

(10) Patent No.: US 7,850,868 B2
(45) Date of Patent: Dec. 14, 2010

(54) LYOTROPIC LIQUID CRYSTALLINE MIXTURE, COATING LIQUID, AND OPTICAL ANISOTROPIC FILM

(75) Inventors: Shoichi Matsuda, Ibaraki (JP); Kyoko Nishiguchi, Ibaraki (JP); Tadayuki Kameyama, Ibaraki (JP)

(73) Assignee: Nitto Denko Corporation, Ibaraki-shi, Osaka (JP)

(*) Notice: Subject to any disclaimer, the term of this patent is extended or adjusted under 35 U.S.C. 154(b) by 0 days.

(21) Appl. No.: 12/513,719

(22) PCT Filed: Jul. 8, 2008

(86) PCT No.: PCT/JP2008/062308

§ 371 (c)(1),
(2), (4) Date: Jun. 9, 2009

(87) PCT Pub. No.: WO2009/037911

PCT Pub. Date: Mar. 26, 2009

(65) Prior Publication Data

US 2010/0038589 A1     Feb. 18, 2010

(30) Foreign Application Priority Data

Sep. 20, 2007  (JP) .............................. 2007-243435

(51) Int. Cl.
- *C09K 19/00* (2006.01)
- *C09K 19/20* (2006.01)
- *C09K 19/22* (2006.01)
- *G02F 1/03* (2006.01)
- *C09B 29/00* (2006.01)

(52) U.S. Cl. .................... 252/299.01; 252/299.64; 252/299.68; 428/1.1; 430/20; 430/270.1; 534/573; 534/677

(58) Field of Classification Search ............ 252/299.01, 252/299.64, 299.68; 428/1.3, 1.31, 1.1; 534/573, 534/677; 430/20, 270.1
See application file for complete search history.

(56) References Cited

U.S. PATENT DOCUMENTS

| 5,609,796 | A | 3/1997 | Yamamoto et al. | |
| 2009/0269513 | A1* | 10/2009 | Nishiyama et al. | 428/1.2 |

FOREIGN PATENT DOCUMENTS

| EP | 1867684 A1 | 12/2007 |
| JP | 62-265356 A | 11/1987 |
| JP | 7-159615 A | 6/1995 |
| JP | 2007-126628 A | 5/2007 |

OTHER PUBLICATIONS

International Search Report of PCT/JP2008/062308, Mailing Date of Sep. 30, 2008.

* cited by examiner

*Primary Examiner*—Geraldina Visconti
(74) *Attorney, Agent, or Firm*—Westerman, Hattori, Daniels & Adrian, LLP

(57) ABSTRACT

The lyotropic liquid crystalline mixture of the present invention comprises at least a first azo compound and a second azo compound in relation of constitutional isomers wherein the first azo compound and the second azo compound are the constitutional isomers different in a binding site of at least an azo group. The first azo compound is preferably an azo compound wherein the azo group is bonded to an ortho-position of a hydroxyl group of an aminonaphthol skeleton. The second azo compound is preferably an azo compound wherein the azo group is bonded to an ortho-position of an amino group of an aminonaphthol skeleton.

The lyotropic liquid crystalline mixture of the present invention may be utilized as a forming material of an optical anisotropic film, for example.

9 Claims, No Drawings

LYOTROPIC LIQUID CRYSTALLINE MIXTURE, COATING LIQUID, AND OPTICAL ANISOTROPIC FILM

TECHNICAL FIELD

The present invention relates to a mixture exhibiting lyotropic liquid crystallinity and containing at least two kinds of constitutional isomers of an azo compound, coating liquid containing the mixture, and an optical anisotropic film obtained by forming the coating liquid into a film.

BACKGROUND ART

A perylene pigment has been conventionally known as a material exhibiting lyotropic liquid crystallinity. It has been known that an optical anisotropic film (polarizer) is produced by coating a solution containing the perylene pigment on a base material, and drying the solution (for example, Japanese Unexamined Patent Publication No. 2005-154746).

An azo compound has been also known as a material exhibiting lyotropic liquid crystallinity (for example, "Liquid Crystal" Vol. 11, No. 1, pages 37 to 45 (2007)).

DISCLOSURE OF THE INVENTION

The use of an azo compound allows a favorable optical anisotropic film to be formed.

However, some conventional azo compounds do not exhibit liquid crystallinity in a solution state. Such an azo compounds are not oriented in solution containing the azo compounds. Thus, even though the solution containing the azo compounds is coated on a base material, a favorable optical anisotropic film may not be formed.

The object of the present invention is to provide an azo compound capable of exhibiting liquid crystallinity in a solution state.

Another object of the present invention is to provide a coating liquid containing the azo compound and capable of exhibiting liquid crystallinity, and an optical anisotropic film formed by the above-mentioned coating liquid.

It is conceived that the development of a liquid crystal phase in a solution state of the azo compound is greatly influenced in that the azo compound stacks supermolecularly to form columnars, which wield interaction with each other in solvent.

The inventors of the present invention have further studied about the development factor of a liquid crystal phase in the case of using the azo compound. As a result, they have guessed that it is important to select the azo compound such that interaction between the columnars does not strengthen too much. Under such a guess, the inventors of the present invention have found out that the mixing of the azo compound which does not develop a liquid crystal phase singly with a constitutional isomer thereof allows a liquid crystal phase to be developed.

A lyotropic liquid crystalline mixture of the present invention comprises at least a first azo compound and a second azo compound in relation of constitutional isomers wherein the first azo compound and the second azo compound are the constitutional isomers different in a binding site of at least an azo group.

A lyotropic liquid crystalline mixture of the present invention is such that two kinds of constitutional isomers of an azo compound, which differ in a binding site of the azo group, are mixed. The above-mentioned lyotropic liquid crystalline mixture develops a liquid crystal phase in a solution state. It is guessed that the principle that such a lyotropic liquid crystalline mixture exhibits a liquid crystal phase in a solution state is that columnars formed by two kinds of the azo compounds wield moderate interaction with each other in solvent.

A coating liquid exhibiting liquid crystallinity may be prepared by dissolving the lyotropic liquid crystalline mixture in proper solvent. The coating liquid is coated on a proper base material and dried, so that an oriented state of the azo compounds is fixed. The film obtained by drying the coating liquid is an optical anisotropic film.

The optical anisotropic film may be utilized as a polarizer, for example.

BEST MODE FOR CARRYING OUT THE INVENTION

Lyotropic Liquid Crystalline Mixture

A lyotropic liquid crystalline mixture of the present invention comprises at least two kinds of constitutional isomers of an azo compound.

Here, in the present specification, two kinds of the azo compounds are distinguished into 'a first azo compound' and 'a second azo compound'. However, these prefixes of 'first' and 'second' are used for distinguishing between the terms, and do not signify superiority or inferiority and order of physical properties.

The first azo compound and the second azo compound are the constitutional isomers different in a binding site of at least an azo group. Preferably, both the first azo compound and the second azo compound are disazo compounds.

Here, 'Lyotropic liquid crystallinity' is such a property that phase transfer between an isotropic phase and a liquid crystal phase occurs when the temperature, concentration or the like of a solution is changed in a solution state.

'Constitutional isomer' signifies compounds, which are equal in molecular formula but different in bonding between atoms (structural formula).

'Azo compound' signifies a compound represented by the general formula: R—N=N—R'. 'Azo group' signifies '—N=N—'.

'Disazo compound' signifies an azo compound having two azo groups in a molecular structure.

In the present specification, the representation of 'A to B' signifies 'A or more and B or less'.

With regard to the above-mentioned lyotropic liquid crystalline mixture, the azo compound develops a liquid crystal phase in a solution state. According to the present invention, even in the case of the azo compound not exhibiting liquid crystallinity is used, the mixing of the azo compound with a constitutional isomer thereof allows a liquid crystal phase to be developed. Also, according to the present invention, even in the case of the single azo compound exhibiting liquid crystallinity is used, the mixing of the azo compound with a constitutional isomer thereof allows a more stable liquid crystal phase to be developed.

The lyotropic liquid crystalline mixture of the present invention may develop a stable liquid crystal phase. Thus, the use of a coating liquid obtained by making this mixture into a solution state allows an optical anisotropic film excellent in optical properties to be formed.

The lyotropic liquid crystalline mixture of the present invention may be in either form of liquid or solid (including powdery). Also, the lyotropic liquid crystalline mixture of the present invention may be in either mixed state such that at least two kinds of azo compounds are mixed approximately uniformly or a state such that one azo compound is ununiformly distributed.

The content of the above-mentioned first azo compound and second azo compound is not particularly limited in the lyotropic liquid crystalline mixture of the present invention. It is preferable that the first azo compound is contained by approximately the same amount as the second azo compound or by more amount than the second azo compound.

For example, the above-mentioned first azo compound is contained preferably 50 parts by mass to 99 parts by mass, and more preferably 55 parts by mass to 85 parts by mass with respect to 100 parts by mass of the total solid content of the lyotropic liquid crystalline mixture.

The above-mentioned second azo compound is contained preferably 1 part by mass to 50 parts by mass, more preferably 1 part by mass and less than 50 parts by mass, and particularly preferably 15 parts by mass to 45 parts by mass with respect to 100 parts by mass of the total solid content of the lyotropic liquid crystalline mixture.

The mixture ratio (mass ratio) of the above-mentioned first azo compound and the above-mentioned second azo compound is preferably 80:20 to 60:40, that is, the first azo compound:the second azo compound=80:20 to 60:40.

Here, the above-mentioned lyotropic liquid crystalline mixture may contain other compounds in addition to the first azo compound and the second azo compound.

The above-mentioned first azo compound is preferably a disazo compound. The above-mentioned first azo compound more preferably has an aminonaphthol skeleton in the molecular structure wherein an azo group is bonded to an ortho-position or para-position of a hydroxyl group of the aminonaphthol skeleton. The above-mentioned first azo compound particularly preferably has an aminonaphthol skeleton in the molecular structure wherein an azo group is bonded to an ortho-position of a hydroxyl group of the aminonaphthol skeleton. 'Ortho-position of a hydroxyl group' includes '($\alpha$+1) position' of an aromatic ring when the position with the hydroxyl group bonded is regarded as $\alpha$-position of the aromatic ring. 'Para-position of a hydroxyl group' includes '($\alpha$+2) position' of an aromatic ring when the position with the hydroxyl group bonded is regarded as $\alpha$-position of the aromatic ring.

The above-mentioned first azo compound is most preferably a disazo compound represented by the following general formula (I) in the form of free acid.

[Formula 1]

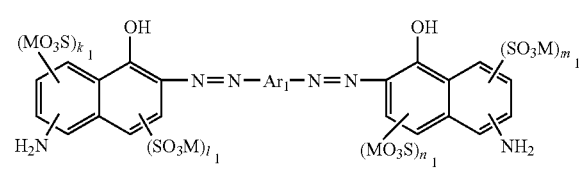

(I)

In the general formula (I), $Ar_1$ denotes a substituted or unsubstituted divalent aromatic ring group, $k_1$ and $m_1$ each denote an integer of 0 to 3, $l_1$ and $n_1$ each denote an integer of 0 to 2, and M denotes a counter ion. The $k_1$ and $m_1$ are preferably 0, and the $l_1$ and $n_1$ are preferably 1. The M is preferably hydrogen atom, alkali metal atom, alkali earth metal atom, metal ion, substituted or unsubstituted ammonium ion, or the like.

$Ar_1$ of the general formula (I) includes a divalent aromatic ring group having a single aromatic ring, or a divalent aromatic ring group having two or more aromatic rings. $Ar_1$ is preferably a divalent aromatic ring group having two aromatic rings. The divalent aromatic ring group having two aromatic rings may be such that the two aromatic rings are bonded through an optional linking group or the two aromatic rings are condensed.

The above-mentioned $Ar_1$ is preferably a divalent aromatic ring group represented by the following formula (III).

[Formula II]

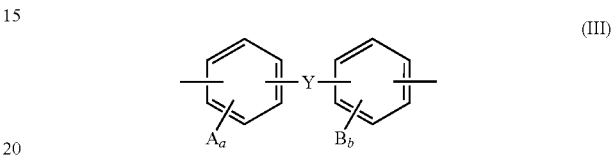

(III)

In the formula (III), Y denotes a covalent bond, or an atom or a group selected from the group consisting of a $C_2H_2$ group, a $CH_2$ group, a $C(CH_3)_2$ group, a $C(CZ_3)_2$ group (wherein the Z is halogen), a CO group, an oxygen atom, a sulfur atom, and a $SO_2$ group. Preferably, the Y is a covalent bond or a $C_2H_2$ group. A and B denote substituents, a denotes a substitution number of the A, and b denotes a substitution number of the B. The a is an integer of 0 to 4 and the b is an integer of 0 to 4.

The A and B in the formula (III) is each independently an atom or a group selected from the group consisting of halogen, a substituted or unsubstituted alkyl group with a carbon number of 1 to 4, a substituted or unsubstituted alkoxy group with a carbon number of 1 to 4, a hydroxyl group, a nitro group, a sulfonic acid group, a cyano group, a thioalkyl group, a substituted or unsubstituted aryl group, and the like. As the halogen, fluorine, chlorine, bromine, and iodine are cited, for example. As the substituted alkyl group, a halogenated alkyl group is cited, for example.

$Ar_1$ of the above-mentioned general formula (I) is preferably one kind selected from the aromatic ring group family (IV) described below. However, M of the following group (IV) denotes a counter ion similarly to the above-mentioned general formula (I).

[Formula III]

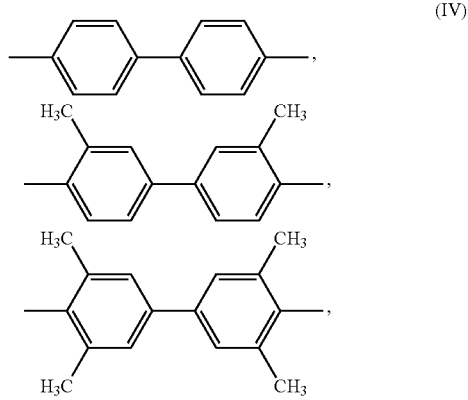

(IV)

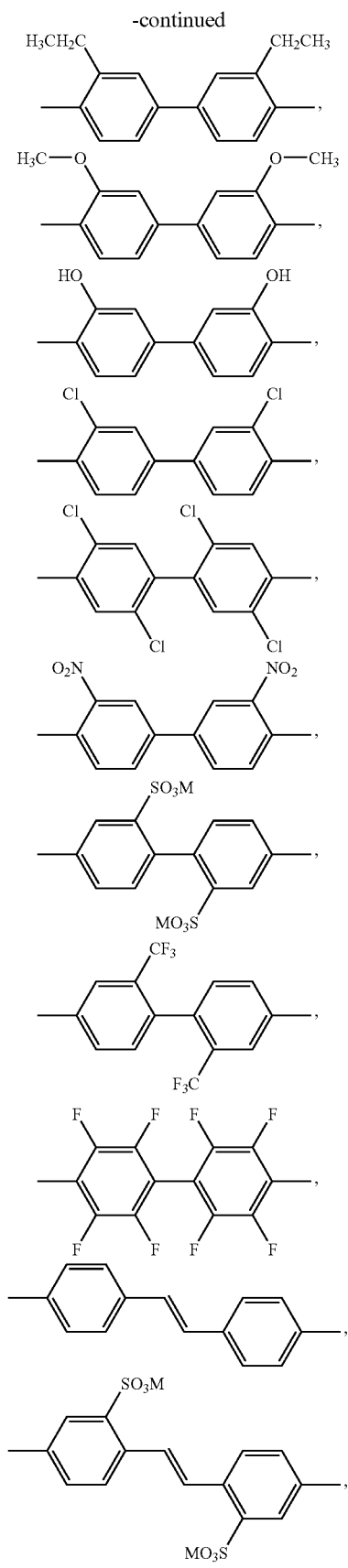

The above-mentioned second azo compound is preferably a disazo compound. The above-mentioned second azo compound more preferably has an aminonaphthol skeleton in the molecular structure wherein an azo group is bonded to an ortho-position or para-position of an amino group of the aminonaphthol skeleton. The above-mentioned second azo compound particularly preferably has an aminonaphthol skeleton in the molecular structure wherein an azo group is bonded to an ortho-position of an amino group of the aminonaphthol skeleton. 'Ortho-position of an amino group' includes '($\beta$+1) position' of an aromatic ring when the position with the amino group bonded is regarded as $\beta$-position of the aromatic ring. 'Para-position of an amino group' includes '($\beta$+2) position' of an aromatic ring when the position with the amino group bonded is regarded as $\beta$-position of the aromatic ring.

The above-mentioned second azo compound is most preferably a disazo compound represented by the following general formula (II) in the form of free acid.

[Formula IV]

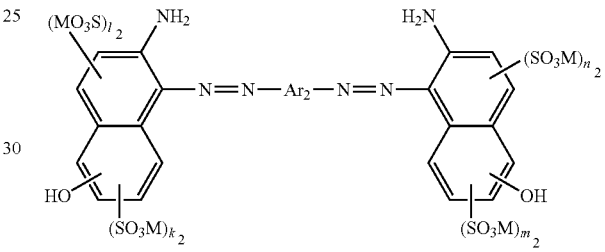

(II)

In the general formula (II), $Ar_2$ denotes a substituted or unsubstituted divalent aromatic ring group, $k_2$ and $m_2$ each denote an integer of 0 to 3, $l_2$ and $n_2$ each denote an integer of 0 to 2, and M denotes a counter ion. The $k_2$ and $m_2$ are preferably 1 and the $l_2$ and $n_2$ are preferably 0. The M is preferably hydrogen atom, alkali metal atom, alkali earth metal atom, metal ion, substituted or unsubstituted ammonium ion, or the like.

$Ar_2$ of the general formula (II) includes a divalent aromatic ring group having a single aromatic ring or a divalent aromatic ring group having two or more aromatic rings. $Ar_2$ is preferably a divalent aromatic ring group having two aromatic rings. The divalent aromatic ring group having two aromatic rings may be such that the two aromatic rings are bonded through an optional linking group or the two aromatic rings are condensed.

The above-mentioned $Ar_2$ of the general formula (II) is preferably the divalent aromatic ring group represented by the above-mentioned general formula (III). Also, the above-mentioned $Ar_2$ of the general formula (II) is preferably one kind selected from the aromatic ring group family (IV).

The above-mentioned first azo compound and second azo compound may be produced by the following method, for example.

Aromatic diamine is reacted with sodium nitrite ($NaNO_2$) or nitrous acid. Hydrochloric acid is added thereto while maintaining at low temperature to obtain a tetrazonium compound by diazotizing each amino group of the aromatic diamine. The above-mentioned azo compounds may be obtained by subjecting this tetrazonium compound and an aminonaphthol derivative to diazo coupling reaction.

The above-mentioned lyotropic liquid crystalline mixture develops a liquid crystal phase (namely, lyotropic liquid crystal) in a solution state of predetermined concentration. Here, this liquid crystal phase is preferably a nematic liquid crystal phase in view of being excellent in orientation property. This nematic liquid crystal phase also includes the case where a supermolecule is formed and the formation is in a nematic state.

(Coating Liquid)

The coating liquid of the present invention contains the above-mentioned lyotropic liquid crystalline mixture and a solvent.

In the coating liquid, the lyotropic liquid crystalline mixture is preferably dissolved in the solvent.

The solvent is not particularly limited and various kinds of solvents may be used. The solvent is preferably an aqueous solvent. The aqueous solvent includes water, a hydrophilic solvent, and a mixed solvent containing water and the hydrophilic solvent. The hydrophilic solvent is a solvent, which can be dissolved with water uniformly. The hydrophilic solvent includes, for example, alcohols such as methanol, ethanol, or ethylene glycol; cellosolves such as methyl cellosolve or ethyl cellosolve; ketones such as acetone or methyl ethyl ketone; esters such as acetic ether; and the like. Preferably, the solvent is water or a mixed solvent containing water and the hydrophilic solvent.

A concentration of the lyotropic liquid crystalline mixture in the coating liquid is preferably prepared so as to exhibit a liquid crystal phase. The liquid crystal phase is preferably a nematic liquid crystal phase. Here, the liquid crystal phase can be confirmed from an optical pattern of the coating liquid when observed by using a polarization microscope.

The concentration of the lyotropic liquid crystalline mixture in the coating liquid is preferably from 0.5 to 40% by mass, and preferably from 1 to 30% by mass. The coating liquid exhibits a liquid crystal phase in a part of this concentration range.

In addition, a pH of the coating liquid is preferably prepared from about 4 to 10, and more preferably from about 6 to 8.

Further, an additive may be added to the coating liquid. The additive includes, for example, a plasticizer, a heat stabilizer, a light stabilizer, a lubricant, an antioxidant, an ultraviolet absorber, a flame retardant, a colorant, an antistatic agent, a compatibilizing agent, a crosslinking agent, or a thickener. A concentration of the additive in the coating liquid is preferably more than 0% by mass and 10% by mass or less. Also, a surfactant may be added to the coating liquid as an additive. The surfactant is added to improve wettability and applying property of the azo compound to the surface of a base material. The surfactant is preferably a nonionic surfactant. A concentration of the surfactant in the coating liquid is preferably more than 0% by mass and 5% by mass or less.

(Production of Optical Anisotropic Film)

The coating liquid may be utilized as a forming material of an optical anisotropic film, for example.

The optical anisotropic film of the present invention can be obtained by applying the coating liquid on an appropriate base material in a film state and drying the coating film.

The optical anisotropic film of the present invention can be preferably produced by the following step A to step C.

Step A: a step of applying the coating liquid on a base material so as to form a coating film.

Step B: a step of drying the coating film.

Step C: a step of bringing a surface of the coating film dried in the step B into contact with a solution containing at least one kind of a compound salt selected from the group consisting of aluminum salts, barium salts, lead salts, chromium salts, strontium salts, and compound salts having two or more amino groups in a molecule.

The base material may be carried out an orientation treatment on the side on which the coating liquid is applied.

<Step A>

The base material is used for uniformly developing of the coating liquid. The base material is not particularly limited as long as it is appropriate for the object. As the base material, for example, a polymer film (the film includes those which are generally called as a sheet) and a glass plate may be used. In a preferable embodiment, the base material is a single polymer film. In another preferable embodiment, the base material is a laminate including the polymer film. The laminate including the polymer film further preferably includes an orientation layer in addition to the polymer film.

The above-mentioned polymer film is not particularly limited, however, a film being excellent in transparency is preferable (for example, a film having a haze value of 5% or less).

Examples of the polymer film include a film formed from a polymer such as polyester type such as polyethylene terephthalate or polyethylene naphthalate; cellulose type such as diacetylcellulose or triacetylcellulose; polycarbonate type; acryl type such as polymethyl methacrylate; styrene type such as polystyrene or an acrylonitrile-styrene copolymer; olefin type such as polyethylene, polypropylene, polyolefins having a cyclic or norbornene structure, or an ethylene-propylene copolymer; vinyl chloride type; amide type such as nylon or aromatic polyamide; imide type such as polyimide; polyethersulfone type; polyetheretherketone type; polyphenylene sulfide type; vinyl alcohol type; vinylidene chloride type; vinyl butyral type; acrylate type; polyoxymethylene type; epoxy type; and a polymer film containing two or more kinds of mixture of these polymer; or the like. Also, the base material may be a film formed from a laminate body of two or more kinds of the above polymer films.

These polymer films are preferably drawn films.

A thickness of the above-mentioned base material can be suitably designed in accordance with the strength and the like. However, in terms of thickness reduction and weight reduction, the thickness is preferably 300 μm or less, more preferably from 5 to 200 μm, and particularly preferably from 10 to 100 μm.

In the case that the above-mentioned base material contains an orientation layer, this orientation layer is formed by subjecting an orientation treatment to the base material. Examples of the orientation treatment include a mechanical orientation treatment such as a rubbing treatment, a chemical orientation treatment such as an optical orientation treatment, and the like.

The mechanical orientation treatment can be carried out by rubbing in one direction with a cloth or the like on one surface of the base material (or one surface of a suitable coating film formed on one surface of the base material). The orientation layer is formed on one surface of the base material by this mechanical orientation treatment. Also, a drawn film subjected to drawing treatment may be used. The base material or the coating film, on which the rubbing treatment is carried out is not particularly limited and the polymer exemplified as the above-mentioned polymer film may be used. The polymer is preferably an imide type polymer in terms of an orientation efficiency of the azo compound.

The chemical orientation treatment can be carried out by forming an optical orientation film containing an orientation agent on one surface of the base material and radiating light onto the optical orientation film. By this, an orientation layer can be formed on one surface of the base material. Examples of the orientation agent include polymers having a photoreactive functional group that generates a photochemical reaction. The photochemical reaction includes, for example, a photoisomerization reaction, an optical ring-opening-closing reaction, a photodimerization reaction, a photodecomposition reaction, and an optical Fries rearrangement reaction, and the like.

The optical orientation film can be formed by dissolving the orientation agent into a suitable solvent to form a solution and applying this solution on the base material.

The coating liquid is applied on the base material. A viscosity of the coating liquid is preferably prepared from 0.1 to 30 mPa·s, and more preferably from 0.5 to 3 mPa·s. Here, the viscosity is a value measured by a rheometer (manufactured by Haake Co., Ltd., product name: RHEOSTRESS 600, measuring condition: double cone sensor shear rate 1000 (1/s)).

A solid state concentration of the coating liquid is relatively low, so that the coating liquid of the present invention is excellent in the fluidity of the liquid, and further can be easily prepared in an optimum application viscosity range of an applicator such as a coater. Therefore, a uniform and thin coating film can be formed on the base material by using the above coating liquid.

As a method for applying the coating liquid on one surface of the base material, an applying method using a suitable coater can be used. The coater is, for example, a reverse roll coater, a positive rotation roll coater, a gravure coater, a rod coater, a slot die coater, a slot orifice coater, a curtain coater, a fountain coater, and the like.

<Step B>

The coating liquid is applied on the base material so that a coating film is formed, and after that, this is dried.

Drying of the coating film may be performed by, for example, drying means such as an air-circulation type thermostatic oven by which hot air or cool air circulates, a heater using a microwave, a far infrared ray, or the like, a roll heated for temperature adjustment, a heat pipe roll, or a metal belt.

The drying temperature is below or equal to the isotropic phase transition temperature of the coating liquid, and it is preferable to dry the coating film by gradually raising the temperature from low temperature to high temperature. The above drying temperature is preferably from 10° C. to 80° C., and more preferably from 20° C. to 60° C. Within such a temperature range, a dried coating film having small thickness variation can be obtained.

The drying time can be suitably selected in accordance with the drying temperature and the kind of the solvent. The drying time is, for example, from 1 to 30 minutes, and preferably from 1 to 10 minutes in order to obtain a dried coating film having small thickness variation.

The above coating film will have a higher concentration in the drying process and, in accordance therewith, the oriented azo compound will be fixed in that state. A thickness of the obtained dried coating film is preferably from 0.1 to 10 µm, more preferably from 0.1 to 1 µm, and particularly preferably from 0.2 to 0.8 µm. The residual solvent amount of the dried coating film is preferably 1% by mass or less, and more preferably 0.5% by mass or less.

The obtained dried coating film is an optical anisotropic film of the present invention.

<Step C>

The surface of the dried coating film (the surface opposite to the bonded surface of the base material) may be imparted water resistance.

Concretely, the surface of the dried coating film formed in the above step B is brought into contact with a solution containing at least one kind of a compound salt selected from the group consisting of aluminum salt, barium salt, lead salt, chromium salt, strontium salt, and compound salts having two or more amino groups in a molecule.

Examples of the above compound salt include aluminum chloride, barium chloride, lead chloride, chromium chloride, strontium chloride, 4,4'-tetramethyldiaminodiphenylmethane hydrochloride, 2,2'-dipyridyl hydrochloride, 4,4'-dipyridyl hydrochloride, melamine hydrochloride, tetraaminopyrimidine hydrochloride, and the like. By forming a layer of such a compound salt on the surface of the dried coating film, the surface of the dried coating film can be made insoluble or slightly soluble to water. Therefore, water resistance can be imparted to the dried coating film.

In the solution containing the above compound salt, a concentration of the compound salt is preferably from 3 to 40% by mass, and more preferably from 5 to 30% by mass.

As a method of bringing the solution containing the above compound salt into contact with the surface of the dried coating film, arbitrary one can adopt. The method includes, for example, a method of applying the solution containing the above compound salt onto the surface of the coating film, a method of immersing the coating film into the solution containing the above compound salt, or the like. In the case where these methods are adopted, the surface of the dried coating film is preferably dried in advance after being washed with water or an arbitrary medium.

<Optical Anisotropic Film>

The above-mentioned optical anisotropic film exhibits absorption dichroism, preferably, in at least a part of wavelengths of 380 nm to 780 nm. The dichroic ratio of the above-mentioned optical anisotropic film is preferably 1.1 or more at a wavelength of 550 nm.

The above-mentioned optical anisotropic film having such optical properties may be utilized as a polarizer, for example.

The above-mentioned dichroic ratio may be measured by the method described in the following Examples.

A thickness of the above-mentioned optical anisotropic film is not particularly limited. The optical anisotropic film of the present invention is formed by applying the coating liquid as described above, so that the thickness of the optical anisotropic film becomes thinner. Concretely, the thickness of the optical anisotropic film is preferably from 0.1 to 1 µm, and more preferably from 0.2 to 0.8 µm.

<Application of Optical Anisotropic Film>

The optical anisotropic film of the present invention exhibits absorption dichroism, so that the film is preferably utilized as a polarizer. The polarizer is an optical film having such functions as to allow certain linearly polarized light in polarized light or natural light to transmit.

The optical anisotropic film of the present invention is generally used in such a state as to be laminated on the base material.

The optical anisotropic film of the present invention may be used singly or laminated other films. As other films, for example, a protective film and a retardation film may be cited. A polarizing plate can be formed by laminating the protective film and/or the retardation film on the optical anisotropic film of the present invention.

In the case where the other film is laminated, in practice, an appropriate adhesive layer is provided between these.

The application of the optical anisotropic film of the present invention is not particularly limited, however the film is preferably utilized as a construction component of various image displays.

The image displays include a liquid crystal display, an organic EL display, a plasma display, and others, and preferably a liquid crystal display. A preferable application of the image displays is a television set, and particularly preferably a large-scale television set having a screen size of 40 inches or more. In the case where the image display is a liquid crystal display, preferable application thereof is OA apparatus such as a television set, a personal computer monitor, a notebook personal computer, and a copying machine; portable apparatus such as a portable telephone, a clock, a digital camera, a portable digital assistance (PDA), and a portable game machine; a home-use electric apparatus such as a video camera and an electronic range; apparatus to be mounted on a vehicle such as a back monitor, a monitor for a car navigation system, and a car audio device; an exhibition apparatus such as an information monitor for commercial shops; guarding apparatus such as a monitor for supervision; and assisting and medical apparatus such as a monitor for assisting senior persons and a monitor for medical use.

EXAMPLES

In the following, Example and Comparative Example are given in order to further describe the present invention. Here, the present invention is not limited only to the following Example and Comparative Example. The methods for analysis used in the Example and Comparative Example are as follows.

(1) Confirmation of Liquid Crystal Phase:

The liquid crystal phase was observed by holding coating liquid between two sheets of slide glass with the use of a polarizing microscope [product name "BX50", manufactured by Olympus Corporation] while changing the temperature.

(2) Polarization Property:

The polarized absorption spectrum was measured by using "V-7100 spectrophotometer" manufactured by JASCO Corporation. The measurement was performed at a measuring wavelength of 380 nm to 780 nm. The dichroic ratio (dichroic ratio=$A\perp/A//$) was calculated from this spectrum. The maximum value of the obtained dichroic ratio was regarded as a representative value.

However, '$A//$' denotes absorbance in the case of incidenting polarized light having electric field vector parallel to transmission axis. '$A\perp$' denotes absorbance in the case of incidenting polarized light having electric field vector vertical to transmission axis.

(3) Measurement of Thickness:

A portion of the dried coating film formed on a glass plate was peeled and the thickness was measured as a step between the film and the dried coating film by using a three-dimensional non-contact surface form measuring system (product name: "Micromap MM5200," manufactured by Ryoka Systems Inc.).

Example

Synthesis of Azo Compound 1.85 g of 4,4'-diaminostilbene-2,2'-disulfonic acid, 10 mL of 1N-NaOH aqueous solution, 10 mL of ion-exchange water, and 0.7 g of sodium nitrite were put in a reaction vessel provided with a stirrer and stirred for 30 minutes. After the stirring, mixed solution containing 4,4'-diaminostilbene-2,2'-disulfonic acid was obtained.

25 mL of 1N-HCl aqueous solution was put in an another reaction vessel provided with a stirrer and stirred while maintaining at a temperature of 5° C. or less, and the above-mentioned mixed solution of 4,4'-diaminostilbene-2,2'-disulfonic acid was dropped thereinto and thereafter stirred for 30 minutes. After the stirring, tetrazotized tetrazonium solution was obtained.

2.6 g of 6-amino-1-naphthol-3-sulfonic acid, 20 mL of 1N-NaOH aqueous solution, and 30 mL of ion-exchange water were put in an another reaction vessel provided with a stirrer and stirred while maintaining at a temperature of 5° C. or less, and the above-mentioned tetrazonium solution was dropped thereinto. After finishing dropping, the solution was returned to room temperature, stirred for 12 hours, and thereby subjected to azo coupling reaction. Sodium chloride was added to this solution until saturated, and the precipitated solid content was filtered and thereafter dried to obtain 1.5 g of solid content.

This solid content was analyzed by FT-IR, 1H NMR, and ESI/MS. As a result, it was confirmed that this solid content was a mixture of the azo compound represented by the following formula (V) and the azo compound represented by the formula (VI). The composition of this mixture was the azo compound represented by the formula (V): the azo compound represented by the formula (VI)=2.2:1 (mass ratio).

[Formula V]

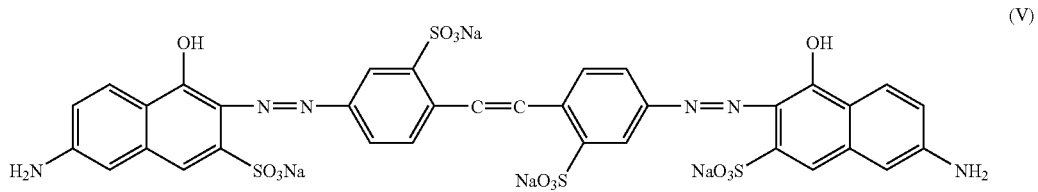

(V)

[Formula VI]

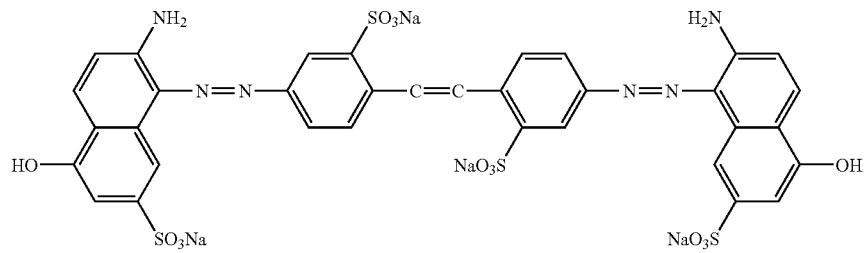

(VI)

(Preparation of Coating Liquid)

0.2 g of the above-mentioned solid content (the mixture of the azo compounds) was dissolved in 50 mL of ion-exchange water and concentrated by using a rotary evaporator until the solid content concentration became 8.4% by mass to prepare the coating liquid of Example. This coating liquid was observed with a polarizing microscope [product name "BX50", manufactured by Olympus Corporation]. As a result, this coating liquid exhibited a nematic liquid crystal phase.

(Production of Film)

The above-mentioned coating liquid was uniformly applied on a glass plate (a thickness of 1.3 mm) by using a bar coater [trade name "mayer rot HS1.5", manufactured by BUSCHMAN], and thereafter air-dried in a thermostatic chamber at a temperature of 23° C. The dried coating film thus obtained had a thickness of 0.4 μm. When the polarization property of this dried coating film was investigated, the dichroic ratio (representative value) was 1.2 at a wavelength of 550 nm. Accordingly, this dried coating film is an optical anisotropic film exhibiting absorption dichroism.

Comparative Example

Synthesis of Azo Compound 1.85 g of 4,4'-diaminostilbene-2,2'-disulfonic acid, 20 mL of concentrated hydrochloric acid, and 30 mL of ion-exchange water were projected into a reaction vessel provided with a stirrer and cooled to a temperature of 0° C., and thereafter 0.7 g of sodium nitrite was projected thereinto and stirred for 1 hour while cooled. After stirring, tetrazotized tetrazonium solution was obtained.

2.6 g of 6-amino-1-naphthol-3-sulfonic acid and 30 mL of ion-exchange water were projected into an another reaction vessel provided with a stirrer, and 1N-NaOH aqueous solution was added thereto while stirred until pH=9 and cooled to a temperature of 0° C. This solution was maintained at a temperature of 0 to 5° C., and the above-mentioned tetrazonium solution was dropped thereinto while maintaining pH=8 to 9 by dropping 2N-NaOH aqueous solution. After finishing dropping, the solution was returned to room temperature, stirred for 12 hours and thereby subjected to azo coupling reaction. Sodium chloride was added to this solution until saturated, and the precipitated solid content was filtered and thereafter dried to obtain 7.0 g of solid content.

This solid content was analyzed by FT-IR, 1H NMR, and ESI/MS. As a result, it was confirmed that this solid content was composed of a single substance of the azo compound represented by the above-mentioned formula (V).

(Preparation of Coating Liquid)

0.2 g of the above-mentioned solid content (the single substance of the azo compounds) was dissolved in 50 mL of ion-exchange water and concentrated by using a rotary evaporator until the solid content concentration became 9.2% by mass to prepare the coating liquid of Comparative Example. This coating liquid was observed with a polarizing microscope [product name "BX50", manufactured by Olympus Corporation]. As a result, a precipitated crystal was observed and a liquid crystal phase was not observed in this coating liquid.

(Production of Film)

The above-mentioned coating liquid was uniformly applied on a glass plate (a thickness of 1.3 mm) by using a bar coater [trade name "mayer rot HS1.5", manufactured by BUSCHMAN], and thereafter air-dried in a thermostatic chamber at a temperature of 23° C. The dried coating film thus obtained had a thickness of 0.4 μm. Also, the dried coating film was an isotropic layer exhibiting no absorption dichroism (the dichroic ratio (representative value) was 1.0).

INDUSTRIAL APPLICABILITY

The lyotropic liquid crystalline mixture of the present invention and the coating liquid containing this mixture may be utilized as a forming material of an optical anisotropic film, for example. This optical anisotropic film may be utilized as a polarizer, for example. The optical anisotropic film may be mounted on image displays (a liquid crystal display is cited representatively), for example.

What is claimed is:

1. A lyotropic liquid crystalline mixture comprising at least a first azo compound and a second azo compound;
   wherein the first azo compound and the second azo compound are constitutional isomers different in a binding site of at least an azo group,
   wherein the first azo compound and the second azo compound are disazo compounds, and
   wherein said disazo compounds each comprise two aminonaphthol skeletons.

2. The lyotropic liquid crystalline mixture according to claim 1, wherein the first azo compound has an aminonaphthol skeleton and the azo group is bonded to an ortho-position of a hydroxyl group of the aminonaphthol skeleton.

3. The lyotropic liquid crystalline mixture according to claim 1, wherein the first azo compound is a compound represented by the following general formula (I):

[Formula 1]

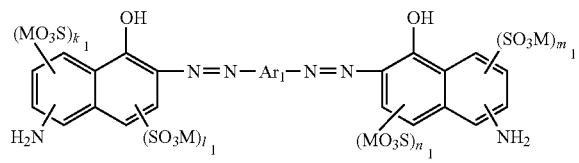

(I)

wherein, $Ar_1$ denotes a substituted or unsubstituted divalent aromatic ring group, $k_1$ and $m_1$ each denote an integer of 0 to 3, $l_1$ and $n_1$ each denote an integer of 0 to 2, and M denotes a counter ion.

4. The lyotropic liquid crystalline mixture according to claim 1, wherein the second azo compound has an aminonaphthol skeleton and the azo group is bonded to an ortho-position of an amino group of the aminonaphthol skeleton.

5. The lyotropic liquid crystalline mixture according to claim 1, wherein the second azo compound is a compound represented by the following formula (II):

[Formula 2]

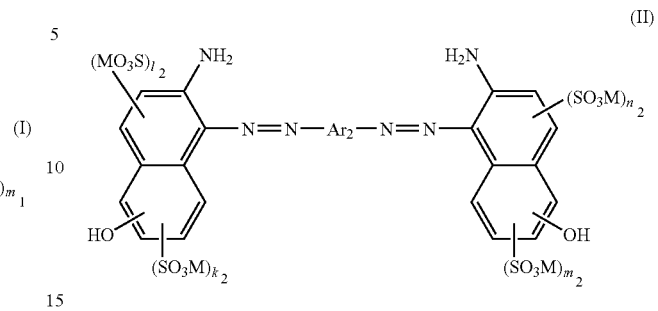

(II)

wherein, $Ar_2$ denotes a substituted or unsubstituted divalent aromatic ring group, $k_2$ and $m_2$ each denote an integer of 0 to 3, $l_2$ and $n_2$ each denote an integer of 0 to 2, and M denotes a counter ion.

6. The lyotropic liquid crystalline mixture according to claim 1, wherein the content of the first azo compound is approximately the same as the content of the second azo compound, or more than the content of the second azo compound.

7. A coating liquid comprising the lyotropic liquid crystalline mixture according to claim 1 and a solvent.

8. The coating liquid according to claim 7 coated on a base material in a thin film state and dried to form an optical anisotropic film.

9. The lyotropic liquid crystalline mixture according to claim 1, wherein a mixture ratio of the first azo compound and the second azo compound is 80:20 and 60:40.

* * * * *